June 9, 1936.  J. ASHWORTH  2,043,877
OIL LEVEL INDICATOR
Filed May 15, 1935
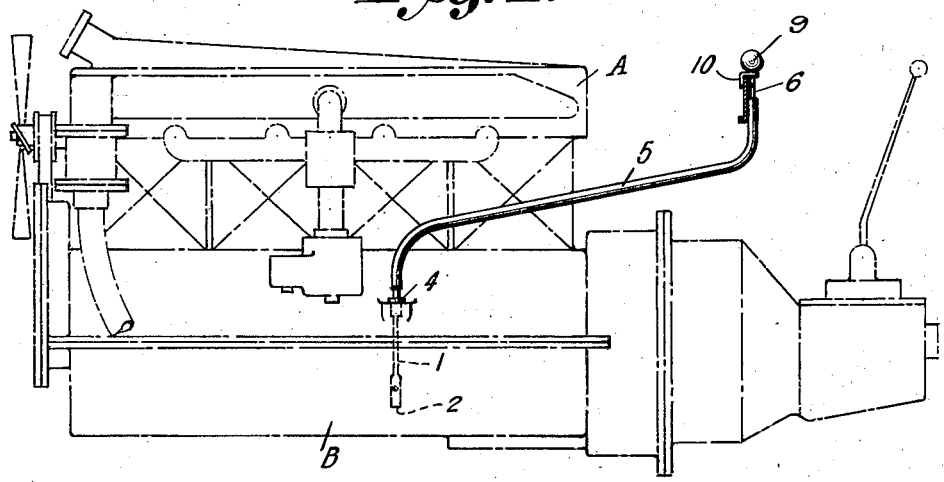
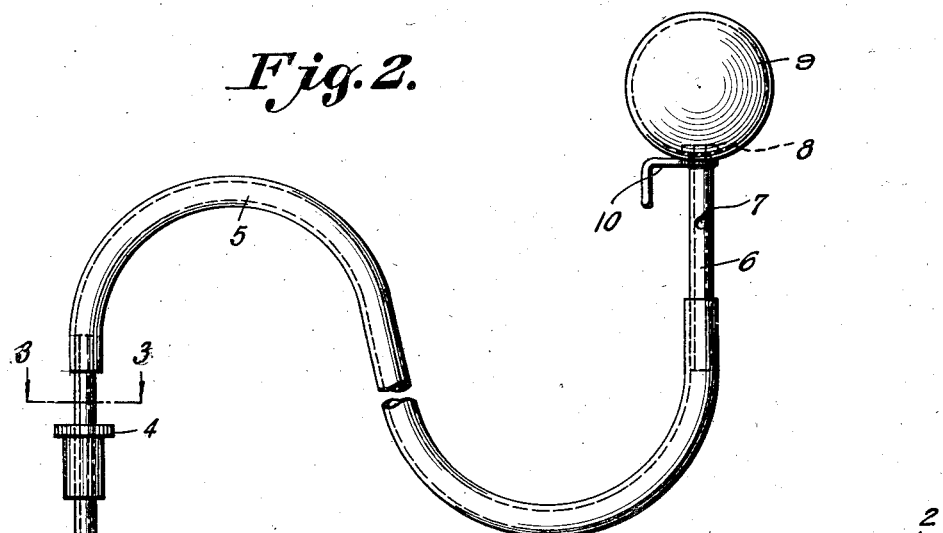
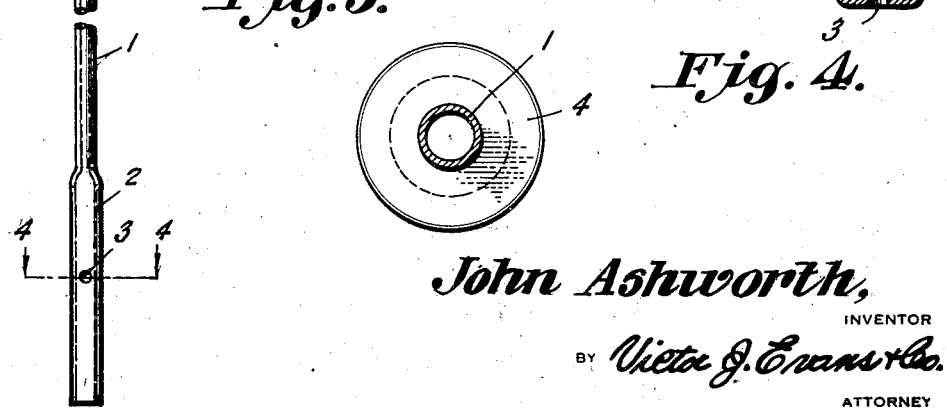
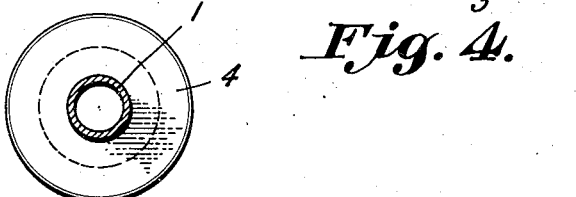
John Ashworth,
INVENTOR Patented June 9, 1936

2,043,877

UNITED STATES PATENT OFFICE 2,043,877

OIL LEVEL INDICATOR

John Ashworth, Albany, N. Y.

Application May 15, 1935, Serial No. 21,675

3 Claims. (Cl. 116—118)

This invention relates to oil level indicators, and its general object is to provide what may be termed a remote indicator for testing the oil level in the crank case of an internal combustion engine of motor vehicles, in that by its use, it can be ascertained from the driver's seat in an easy and expeditious manner, whether or not oil should be added to the crank case, with the result my indicator will overcome the disadvantageous features attendant upon the usual rod indicator now in general use.

A further object of the invention is to provide a remote oil level indicator of the character set forth, that is simple in construction, can be applied to motor vehicles now in use, is inexpensive to manufacture and extremely efficient in use, operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation illustrating my oil level indicator applied to the internal combustion engine of a motor vehicle.

Figure 2 is a view of the indicator per se.

Figure 3 is a sectional view taken approximately on line 3—3 of Figure 2, looking in the direction of the arrows.

Figure 4 is a sectional view taken approximately on line 4—4 of Figure 3, looking in the direction of the arrows.

Referring to the drawing in detail, and particularly to Figure 1, it will be noted that I have illustrated my indicator in use, and the letter A indicates an internal combustion engine, and B the crank case thereof.

My indicator includes a hollow rod like member 1 that is provided with a relatively flat lower portion 2 which has registering openings 3 arranged in the spaced parallel walls thereof, as best shown in Figure 4, and these openings are preferably arranged slightly above a point midway the ends of the flat lower portion, as shown in Figure 3.

The rod like member is of course hollow throughout its length and secured adjacent to the upper end thereof is a cap 4 having a body of a size to fit the usual rod receiving opening of the crank case, as clearly shown in Figure 1, so that the cap acts in the capacity as a closure.

The upper end of the hollow rod like member 1 is adapted to receive one end of a tube 5 which may be formed from rubber, but in any event is preferably flexible, so that it can be conveniently applied and removed with respect to the upper end of the member 1.

In the form as shown, the opposite end of the tube 5 has arranged therein a metallic tube section 6, having a vent opening 7 therein, and formed on or otherwise secured to the upper end of the tube section 6 is a collar 8 which acts as a stop in holding a hollow rubber or compressible bulb member 9 on the tube section 6, as clearly shown in Figure 2.

The tube section 6 is of a length to extend a considerable distance above the adjacent end of the tube 5 and has secured thereto one end portion of a right angle bracket 10, and the said end portion cooperates with the collar 8 in securing the bulb member 9 to the tube section.

The right angle bracket 10 also serves as a hook by means of which the bulb end of the indicator can be hung or supported under the instrument board of the vehicle, when not in use, as indicated in Figure 1.

In the use of my indicator, the operator places a finger over the opening 7 to close the same and while keeping the opening 7 closed, the bulb member is squeezed or depressed. In the event the oil level in the crank case is below the openings 3, it will be obvious that the bulb member will be inflated rapidly due to the passage of air through the device. However, if the oil level is above the openings 3 the inflation will be slow, due to the suction drawing the oil up within the hollow rod like member, consequently it can be determined with very little effort on the part of the operator and without leaving the driver's seat whether or not oil should be added to the crank case. The vent opening 7 will of course cause the oil that may be drawn into the member 1 to return to the crank case as well as inflate the member 9 when the latter is collapsed.

The flat lower portion 2 may be provided with graduations or some means to indicate the oil level, but in any event the rod like member can be used in the same manner as the gage rods now in general use, merely by removing the same for inspection.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An oil indicator comprising a rod like member having a flat lower portion provided with an inlet, a cap secured to the rod like member adjacent its upper end for supporting the rod like member in the crank case of an engine, a flexible tubular member having one end connected to the upper end of the rod like member, a metallic tube section connected to the opposite end of the flexible tubular member and having a vent opening therein, a compressible bulb for the metallic tube section, means for securing the bulb to the upper end thereof, and said means including a hanger bracket.

2. An oil indicator comprising a hollow rod like member to replace the usual oil gage rod for the crank case of the engine of a vehicle and removably received in the opening thereof to extend below the required oil level of the crank case, said member having a flat lower portion provided with an inlet, a cap secured to said member to close the gage receiving opening and to support the member therethrough, tubular means connected to said member, and vented suction means connected to and communicating with the tubular means.

3. An oil indicator comprising a rod like member to be removably mounted in the usual oil gage rod receiving opening of the crank case of the engine of a vehicle and having a flat lower portion provided with an inlet therein, a cap secured to said member adjacent its upper end to close the gage rod opening and to support the member within the latter, a flexible tubular member having one end connected to the upper end of the rod like member, a metallic tube section connected to the opposite end of the flexible tube member and having a vent opening therein, suction means secured to the metallic tube section, and a bracket carried by the metallic tube section and to be received by suitable means adjacent the operator's seat of the vehicle to support the suction means accordingly.

JOHN ASHWORTH.